(12) United States Patent
Furumura et al.

(10) Patent No.: US 8,704,202 B2
(45) Date of Patent: Apr. 22, 2014

(54) RF POWDER PARTICLES INCLUDING AN INDUCTANCE ELEMENT, A CAPACITANCE ELEMENT, AND A PHOTOVOLTAIC CELL AND METHOD FOR EXCITING RF POWDER

(75) Inventors: Yuji Furumura, Yokohama (JP); Naomi Mura, Tokyo (JP); Shinji Nishihara, Kokubunji (JP); Katsuhiro Fujino, Yokohama (JP); Katsuhiko Mishima, Yokohama (JP); Susumu Kamihashi, Yokohama (JP)

(73) Assignee: Philtech Inc., Tokyo (JP)

( * ) Notice: Subject to any disclaimer, the term of this patent is extended or adjusted under 35 U.S.C. 154(b) by 1219 days.

(21) Appl. No.: 12/516,715

(22) PCT Filed: Nov. 26, 2007

(86) PCT No.: PCT/JP2007/072751
§ 371 (c)(1),
(2), (4) Date: Oct. 20, 2009

(87) PCT Pub. No.: WO2008/065993
PCT Pub. Date: Jun. 5, 2008

(65) Prior Publication Data
US 2010/0071746 A1    Mar. 25, 2010

(30) Foreign Application Priority Data
Nov. 28, 2006  (JP) .................................. 2006-320338

(51) Int. Cl.
*G06K 5/00*    (2006.01)
(52) U.S. Cl.
USPC ...................................... 250/556; 250/559.4
(58) Field of Classification Search
USPC .............. 250/556, 559.4, 203.4, 221, 559.44, 250/239; 343/866–895, 795, 741; 356/71, 356/73
See application file for complete search history.

(56) References Cited

U.S. PATENT DOCUMENTS

| | | | |
|---|---|---|---|
| 3,946,206 | A | 3/1976 | Darjany |
| 4,058,839 | A | 11/1977 | Darjany |
| 4,745,401 | A | 5/1988 | Montean |

(Continued)

FOREIGN PATENT DOCUMENTS

| | | |
|---|---|---|
| JP | 61-006783 | 1/1986 |
| JP | 63-112198 | 5/1988 |

(Continued)

OTHER PUBLICATIONS

International Preliminary Report on Patentability issued Jun. 3, 2009 for PCT/JP2007/072749 (English translation).

(Continued)

*Primary Examiner* — Que T Le
(74) *Attorney, Agent, or Firm* — Foley & Lardner LLP

(57) ABSTRACT

RF particles that can render more difficult fabrication of counterfeit notes and the like, can generate radiofrequency magnetic fields by oscillation of a tank circuit having a particular resonant frequency, and that can easily and reliably supply electric power for oscillation, RF powder, and a method for exciting the RF powder are provided. In an RF powder particle, a coil (inductance element) serving as an antenna and a capacitor (capacitance element) connected to the coil are formed on an insulating film surface of a substrate. The inductance element and the capacitance element form a tank circuit, and a photovoltaic cell for supplying power to the tank circuit is disposed on the substrate.

28 Claims, 13 Drawing Sheets

(56) References Cited

U.S. PATENT DOCUMENTS

| | | | |
|---|---|---|---|
| 5,204,681 | A | 4/1993 | Greene |
| 5,291,205 | A | 3/1994 | Greene |
| 5,497,952 | A | 3/1996 | Iding |
| 5,518,937 | A | 5/1996 | Furumura et al. |
| 5,581,257 | A | 12/1996 | Greene |
| 5,808,587 | A | 9/1998 | Shima |
| 6,072,394 | A | 6/2000 | Hasegawa et al. |
| 6,285,284 | B1 | 9/2001 | Soe et al. |
| 6,445,271 | B1 | 9/2002 | Johnson |
| 6,479,384 | B2 | 11/2002 | Komai et al. |
| 6,642,827 | B1 | 11/2003 | McWilliams et al. |
| 6,758,397 | B2 | 7/2004 | Catan |
| 6,966,488 | B2 | 11/2005 | Yamagami |
| 6,998,696 | B2 | 2/2006 | Casper et al. |
| 7,061,083 | B1 | 6/2006 | Usami et al. |
| 7,102,522 | B2 * | 9/2006 | Kuhns .................. 340/572.7 |
| 7,158,033 | B2 | 1/2007 | Forster |
| 7,227,504 | B2 | 6/2007 | Deguchi et al. |
| 7,288,320 | B2 | 10/2007 | Steenblik et al. |
| 7,305,223 | B2 | 12/2007 | Liu et al. |
| 7,317,420 | B2 | 1/2008 | Aisenbrey |
| 7,405,665 | B2 | 7/2008 | Yamazaki |
| 7,427,577 | B2 | 9/2008 | Tang et al. |
| 7,508,305 | B2 | 3/2009 | Yamazaki et al. |
| 7,551,054 | B2 | 6/2009 | Mizuno et al. |
| 7,557,757 | B2 | 7/2009 | Deavours et al. |
| 7,623,036 | B2 | 11/2009 | Onderko et al. |
| 7,767,551 | B2 | 8/2010 | Arita et al. |
| 7,876,189 | B2 | 1/2011 | Gilmartin et al. |
| 7,893,837 | B2 | 2/2011 | Yamazaki et al. |
| 7,984,849 | B2 | 7/2011 | Berghel et al. |
| 7,990,137 | B2 | 8/2011 | Antoku |
| 2002/0163479 | A1 | 11/2002 | Lin et al. |
| 2003/0037240 | A1 | 2/2003 | Yamagishi et al. |
| 2003/0095032 | A1 | 5/2003 | Hoshino et al. |
| 2003/0136828 | A1 | 7/2003 | Takesada et al. |
| 2005/0194591 | A1 | 9/2005 | Usami et al. |
| 2006/0044111 | A1 | 3/2006 | Kollar et al. |
| 2006/0044769 | A1 | 3/2006 | Forster et al. |
| 2006/0202269 | A1 | 9/2006 | Suzuki et al. |
| 2007/0138251 | A1 | 6/2007 | Mattlin et al. |
| 2007/0176622 | A1 | 8/2007 | Yamazaki |
| 2007/0210364 | A1 | 9/2007 | Kato et al. |
| 2008/0042168 | A1 | 2/2008 | Watanabe et al. |
| 2008/0130018 | A1 | 6/2008 | Steenblik et al. |
| 2008/0303735 | A1 | 12/2008 | Fujimoto et al. |
| 2009/0206151 | A1 | 8/2009 | Morita |
| 2010/0026441 | A1 | 2/2010 | Wedley |
| 2010/0066619 | A1 | 3/2010 | Furumura et al. |
| 2010/0067166 | A1 | 3/2010 | Furumura et al. |
| 2011/0063184 | A1 | 3/2011 | Furumura et al. |

FOREIGN PATENT DOCUMENTS

| | | |
|---|---|---|
| JP | 63-261851 | 10/1988 |
| JP | 03-087027 | 4/1991 |
| JP | 05-101249 | 4/1993 |
| JP | 06-350495 | 12/1994 |
| JP | 07-263935 | 10/1995 |
| JP | 08-022514 | 1/1996 |
| JP | 08-305970 | 11/1996 |
| JP | 10-069533 | 3/1998 |
| JP | 10-171951 | 6/1998 |
| JP | 11-328493 | 11/1999 |
| JP | 2000-269166 | 9/2000 |
| JP | 2001-230220 | 8/2001 |
| JP | 2002-271122 | 9/2002 |
| JP | 2002-333913 | 11/2002 |
| JP | 2003-058659 | 2/2003 |
| JP | 2003-087044 | 3/2003 |
| JP | 2003-157477 | 5/2003 |
| JP | 2003-179005 | 6/2003 |
| JP | 2003-187195 | 7/2003 |
| JP | 2003-216908 | 7/2003 |
| JP | 2003-242472 | 8/2003 |
| JP | 2004-079746 | 3/2004 |
| JP | 2004-139405 | 5/2004 |
| JP | 2004-159960 | 6/2004 |
| JP | 2005-020058 | 1/2005 |
| JP | 2005-050997 | 2/2005 |
| JP | 2005-183741 | 7/2005 |
| JP | 2005-197630 | 7/2005 |
| JP | 2005-208775 | 8/2005 |
| JP | 2005-216099 | 8/2005 |
| JP | 2005-284333 | 10/2005 |
| JP | 2005-285109 | 10/2005 |
| JP | 2005-340658 | 12/2005 |
| JP | 2005-340791 | 12/2005 |
| JP | 2006-012086 | 1/2006 |
| JP | 2006-027745 | 2/2006 |
| JP | 2006-041986 | 2/2006 |
| JP | 2006-066899 | 3/2006 |
| JP | 2006-180043 | 7/2006 |
| JP | 2006-203852 | 8/2006 |
| JP | 2006-277667 | 10/2006 |
| JP | 2006-285958 | 10/2006 |
| WO | WO 00/36555 | 6/2000 |
| WO | WO 2008/099955 | 8/2008 |

OTHER PUBLICATIONS

International Preliminary Report on Patentability issued Jun. 3, 2009 for PCT/JP2007/072750 (English translation).
International Preliminary Report on Patentability issued Jun. 3, 2009 for PCT/JP2007/072752 (English translation).
International Preliminary Report on Patentability issued Jun. 3, 2009 for PCT/JP2007/072746 (English Translation).
International Search Report mailed Feb. 19, 2008 for PCT/JP2007/072746 (English translation).
International Preliminary Report on Patentability issued Jul. 9, 2009 for PCT/JP2007/074108 (English translation).
Usami, Mitsuo, An ultrasmall RFID chip:m-chip, OYO Buturi, vol. 73, No. 9, pp. 1179-1183 (2004).
Usami, Mitsuo, et al., Ubiquitous Technology IC Tag, first edition, Ohmsha, Ltd., pp. 115, Mar. 15, 2005.
Final Office Action issued for U.S. Appl. No. 12/516,497, mailed on Jun. 5, 2012.
Non-Final Office Action issued for U.S. Appl. No. 12/516,500, mailed on Jun. 14, 2012.
Non-Final Office Action for U.S. Appl. No. 12/516,497, mailed on Nov. 21, 2011, 10 pp.
Non-Final Office Action for U.S. Appl. No. 12/516,500, mailed on Sep. 29, 2011, 15 pp.
Non-Final Office Action for U.S. Appl. No. 12/521,244, mailed on Nov. 8, 2011, 11 pp.
Notice of Allowance for U.S. Appl. No. 12/516,493, mailed on Oct. 17, 2011, 14 pp.
"RFID 'Powder'—World's Smallest RFID Tag," Hitachi, Technovelgy LLC, Feb. 14, 2007, http://www.technovelgy.com/ct/Science-Fiction-News.asp?NewsNum=939, 3 pp.
International Preliminary Report on Patentability for PCT/JP2007/072747, mailed Jun. 11, 2009 (English Translation).
International Preliminary Report on Patentability for PCT/JP2007/072748, mailed Jun. 11, 2009 (English Translation).
International Search Report and Written Opinion for PCT/JP2007/072747, mailed Jan. 29, 2008 (English Translation) 8 pp.
International Search Report and Written Opinion for PCT/JP2007/072748, mailed Feb. 19, 2008 (English Translation).
International Search Report and Written Opinion for PCT/JP2007/072749 mailed Feb. 19, 2008 (English Translation).
International Search Report and Written Opinion for PCT/JP2007/072750, mailed Feb. 26, 2008 (English Translation).
International Search Report and Written Opinion for PCT/JP2007/072751, mailed Feb. 5, 2008 (English Translation).
International Search Report and Written Opinion for PCT/JP2007/072752, mailed Feb. 12, 2008 (English Translation).
Junko Yoshida, "Euro bank notes to embed RFID chips by 2005," EETimes News and Analysis, Dec. 19, 2001, http://www.eetimes.com/story/OEG20011219S0016, 3 pp.

(56) References Cited

OTHER PUBLICATIONS

Li Yang et al., "Design and Development of Novel Miniaturized UHF RFID Tags on Ultra-low-cost Paper-based Substrates," Proceedings of Asia-Pacific Microwave Conference 2006, vol. 12, Issue 15, Dec. 2006, pp. 1493-1496.

N Mura et al., "RF-Powder : Fabrication of 0.15-mm Si-powder Resonating at Microwave Frequencies," IEEE European Microwave Conference, 2007, vol. 9 , Issue 12, Oct. 2007, pp. 392-395.

Non-Final Office Action for U.S. Appl. No. 12/516,643, mailed on Jan. 12, 2012.

Non-final Office Action received for U.S. Appl. No. 12/516,500 dated Feb. 3, 2012.

Notice of Allowance for U.S. Appl. No. 12/516,493, mailed on Jan. 20, 2012.

Notice of Allowance for U.S. Appl. No. 12/521,244, mailed on Jan. 26, 2012.

Restriction Requirement for U.S. Appl. No. 12/516,705, mailed on Dec. 12, 2011.

Tetsuo Nozawa, "Hitachi Achieves 0.05-mm Square Super Micro RFID Tag, 'Further Size Reductions in Mind'," Tech-On Nikkei Business Publications, Feb. 20, 2007, http://techon.nikkeibp.com.jp/english/NEWS_EN/20070220/127959/, 2 pp.

Tim Hornyak, "RFID Powder," Scientific American, Inc., Feb. 2008, pp. 68-71.

W Choi et al., "RFID Tag Antenna with a Meandered Dipole and Inductively Coupled Feed," IEEE Antennas and Propagation Society International Symposium 2006, vol. 9, Issue 14, Jul. 2006, pp. 619-622.

Winston Chai, "Euro notes to get RFID tags from Hitachi?," CBS Interactive Limited, May 23, 2003, http://networks.silicon.com/mobile/0,39024665,10004316,00.htm, 8 pp.

Notice of Allowance for U.S. Appl. No. 12/516,500, mailed on Feb. 26, 2013, 10 pp.

Hitachi Pamphlet, World's smallest and thinnest 0.15×0.15 mm, 7.51-Im thick RFID IC chip, Feb. 6, 2006, http://www.hitachi.com/New/cnews/060206.html, 3 pages.

Non-final Office Action received for U.S. Appl. No. 12/516,705 dated Mar. 19, 2012.

Notice of Allowance received for U.S. Appl. No. 12/516,493 dated Feb. 23, 2012.

Notice of Allowance for U.S. Appl. No. 12/521,244, mailed on Mar. 29, 2012.

Non-Final Office Action issued for U.S. Appl. No. 12/516,648, mailed on May 31, 2013, 29 pp.

Non-Final Office Action for U.S. Appl. No. 12/516,643, mailed on Jun. 12, 2013, 15 pp.

Final Office Action issued for U.S. Appl. No. 12/516,643, mailed on Aug. 17, 2012, 14 pp.

Notice of Allowance for U.S. Appl. No. 12/516,705, mailed on Jul. 18, 2012, 9 pp.

Notice of Allowance for U.S. Appl. No. 12/516,500, mailed on Oct. 26, 2012, 9 pp.

International Preliminary Report on Patentability for PCT/JP2007/072751 mailed Jun. 11, 2009.

Non-Final Office Action for U.S. Appl. No. 12/516,497, mailed on Oct. 1, 2013, 16 pp.

Final Office Action for U.S. Appl. No. 12/516,648, mailed on Nov. 26, 2013, 16 pp.

* cited by examiner

RF POWDER PARTICLES INCLUDING AN INDUCTANCE ELEMENT, A CAPACITANCE ELEMENT, AND A PHOTOVOLTAIC CELL AND METHOD FOR EXCITING RF POWDER

CROSS-REFERENCE TO RELATED APPLICATIONS

The present application is a U.S. national stage application claiming the benefit of International Application No. PCT/JP2007/072751, filed on Nov. 26, 2007, which claims the benefit of Japanese Application No. 2006-320338, filed on Nov. 2006, the entire contents of which are incorporated herein by reference in their entireties.

TECHNICAL FIELD

The present invention relates to RF powder particles that are used as powder, are incorporated in paper and the like, and generate, by irradiation with light from outside, radiofrequency magnetic fields through which information can be read out, etc.; RF powder; and a method for exciting RF powder.

BACKGROUND ART

Currently, IC tags are being considered as commercial products that serve as an entrance to the ubiquitous age. RF-ID (ultra-micro Radio Frequency identification) that have been developed to date include name tags, Suica smart cards, FeRAM cards. Many people expect significant expansion of the IC tag market in the future. However, the growth of IC tag market has yet to fulfill such expectation. This is because there are many problems, such as cost, security, confidentiality, etc., that must be resolved socially.

The RF-ID technology can also be applied to identification of documents with values such as bills, negotiable securities, etc. Counterfeiting of bills and the like has been a problem. One conceivable way of overcoming the problem is to implant IC tags into bills and the like. However, since IC tags are expensive and large-sized, this has not been achieved.

The price of IC tags can be reduced by decreasing the size of the IC tag chips. This is because decreasing the size of IC tag chips increases the number of IC tag chips that can be obtained from one wafer. To date, 0.4 mm-square IC tag chips have been developed. With these IC tag chips, 128-bit memory data inside the chips can be read out with 2.45 GHz microwaves (e.g., refer to Non-Patent Document 1).

On the other hand, a radiofrequency automatic identification (RF/AID) system applicable to identification of bills, credit cards, etc., has also been conceived in which elements other than IC tags are used. One example is a system described in Patent Document 1 that includes a plurality of resonators that resonate at a plurality of radio frequencies, the resonators being disposed and fixed on a substrate composed of paper or plastic by occupying random spatial positions. The plurality of resonators are passive solid resonators. The passive solid resonators include thin dipoles composed of an extended metal. In particular, the passive solid resonators are composed of a material, such as quartz crystal, belonging to a quartz family. For an RF target, the plurality of resonators on the substrate resonate when they are irradiated with radiofrequency electromagnetic waves. The positions of the resonators are recognized by detecting the resonance, thereby conducting identification.

Patent Document 1: Japanese Unexamined Patent Application Publication No. 10-171951

Non-Patent Document 1: Mitsuo USAMI, Ultra-Micro IC Tag Chip "µ-chip" [*Cho Kogata Musen IC Tag Chip, mu-chip*], Oyo Buturi vol. 73, No. 8, 2004, pp. 1179-1183

DISCLOSURE OF INVENTION

Problems to be Solved by the Invention

In improving bill's security by applying conventional IC tags to bills, use of one IC tag per note is too simple and thus easily allows counterfeiting. Thus, proposal of micro circuit elements smaller than the IC tags is desired. Further miniaturization of IC tags is under a significantly large limitation and impossible since the IC tags themselves have built-in IC circuits. This equally applies to the element including passive solid resonators described in Patent Document 1. In view of the above, the present inventors propose an antenna circuit element that includes a tank circuit only. The antenna circuit element can be fabricated as a micro-size element significantly smaller than the IC tags and its size is approximately that of powder particles. On the other hand, when such antenna circuit elements are added, attached, or incorporated into bills and the like, the technology of reading information from the antenna circuit elements becomes important. While information is read by magnetically induced coupling, the main technical problem that needs to be overcome is how to supply electric power for generating radiofrequency electromagnetic fields for electromagnetic coupling.

In view of the above, an object of the present invention is to provide RF powder particles that can render more difficult fabrication of counterfeit notes and the like for sheet-shaped subjects having high proprietary values such as bills, negotiable instruments, and the like, that can generate radiofrequency electromagnetic fields by spontaneous oscillation of a tank circuit having a specific resonant frequency by converting optical energy from outside, and that can generate power required for oscillation easily and reliably; RF powder made up of these RF powder particles; and a method for exciting the RF powder.

Means for Solving the Problems

The RF powder particles, RF powder, and the method for exciting the RF powder related to the present invention have the following features for achieving the above-described object.

According to the RF powder particle of the present invention, an inductance element as an antenna and a capacitance element connected to both ends of the inductance element are formed on an insulating film surface of a substrate, the inductance element and the capacitance element thereby forming a tank circuit, and a photovoltaic cell for supplying electric power to the tank circuit is formed on the substrate.

In the structure described above, the inductance element is preferably formed by a multiple-wound coil formed on the insulating film surface, and the photovoltaic cell is preferably connected between both ends of the coil to supply electric powder.

In the structure described above, the coil is preferably separated from the photovoltaic cell by a distance of 10 µm or more.

In the structure described above, the coil and the photovoltaic cell are preferably separated from each other with an oxide film therebetween.

In the structure described above, the substrate is preferably a semiconductor substrate and the photovoltaic cell is preferably a photodiode including a PN junction formed on the semiconductor substrate.

In the structure described above, the photovoltaic cell is preferably a cell including a plurality of the photodiodes connected in series.

In the structure described above, the photovoltaic cell preferably has two light-receiving surfaces and a light-shielding unit for preventing light irradiation to one of the light-receiving surfaces is preferably provided.

In the structure described above, the inductance element or the capacitance element preferably serves as the light-shielding unit.

In the structure described above, a position of the photovoltaic cell is preferably below a position of the inductance element of the substrate.

In the structure described above, the capacitance element is preferably positioned above the inductance element of the substrate.

An RF powder of the present invention is used in a powder form, and each of the powder particles making up the powder is any one of the RF powder particle described above.

In the structure described above, the tank circuit contained in the RF powder particle preferably generates radiofrequency magnetic fields on the basis of periodic pulsed light applied to the photovoltaic cell from outside.

In the structure described above, a frequency of the periodic pulsed light is equal to a resonant frequency of the tank circuit or the reciprocal of an integer of the resonant frequency.

A method for exciting an RF powder used in a powder form, each powder particle of the powder being the RF powder particle according to any of the aforementioned, in which the RF powder particle is irradiated with light from a light source; electric power is generated in a photovoltaic cell contained in the RF powder particle by using the light; and a radiofrequency magnetic field is generated from a tank circuit contained in the RF powder particle by using the electric power.

In the excitation method described above, the light is preferably laser light emitted from a semiconductor laser or a LED.

In the excitation method described above, the light is preferably periodic pulsed light and a pulse frequency of the periodic pulsed light is preferably made to coincide with a resonant frequency of the tank circuit.

In the excitation method described above, the light is preferably periodic pulsed light and a pulse frequency of the periodic pulsed light is preferably made to coincide with the reciprocal of an integer of a resonant frequency of the tank circuit.

In the excitation method described above, irradiation with the periodic pulsed light is preferably carried out by first periodic pulsed light that irradiates a back surface side of a substrate of the antenna circuit element and second periodic pulsed light that irradiates a front surface side of the substrate.

In the excitation method described above, irradiation timing of the first periodic pulsed light is preferably different from irradiation timing of the second periodic pulsed light.

Advantages

According to the RF powder particle and RF powder of the present invention, since a tank circuit and a photovoltaic cell for supplying electric power to the tank circuit are formed on a substrate, the tank circuit generates a radiofrequency magnetic wave by periodic pulsed light applied from outside and the radiofrequency magnetic field can be detected with a detection coil disposed near the tank circuit. Information regarding the frequency of the RF powder particle can be read out from the radiofrequency magnetic fields generated in the tank circuit.

According to the method of exciting the RF powder of the present invention, an RF powder has a photovoltaic cell for supplying electric power to a tank circuit, and the photovoltaic cell is irradiated with periodic pulsed light to supply circulating current to the tank circuit, and a frequency of the periodic pulsed light is equal to a resonant frequency of the tank circuit or the reciprocal of an integer of the resonant frequency. Thus, radiofrequency magnetic fields can be continuously generated from the tank circuit.

FIG, 10 depicts a plan view of an RF powder particle according to a fourth embodiment of the present invention.

Figure 11:
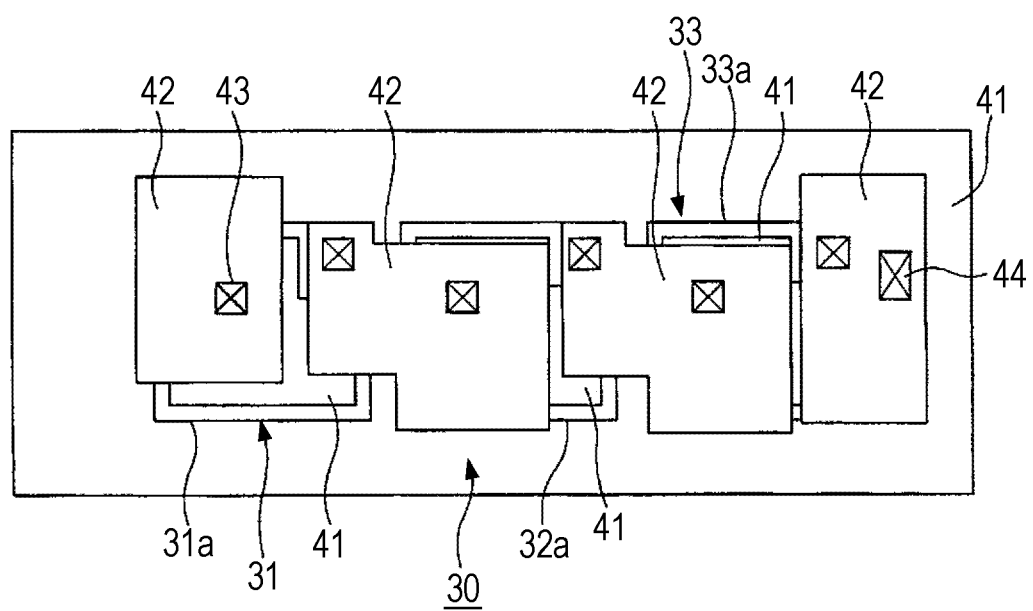

FIG. 11 depicts a plan view of a photodiode unit of a photovoltaic cell of an RF powder particle.

Figure 12:
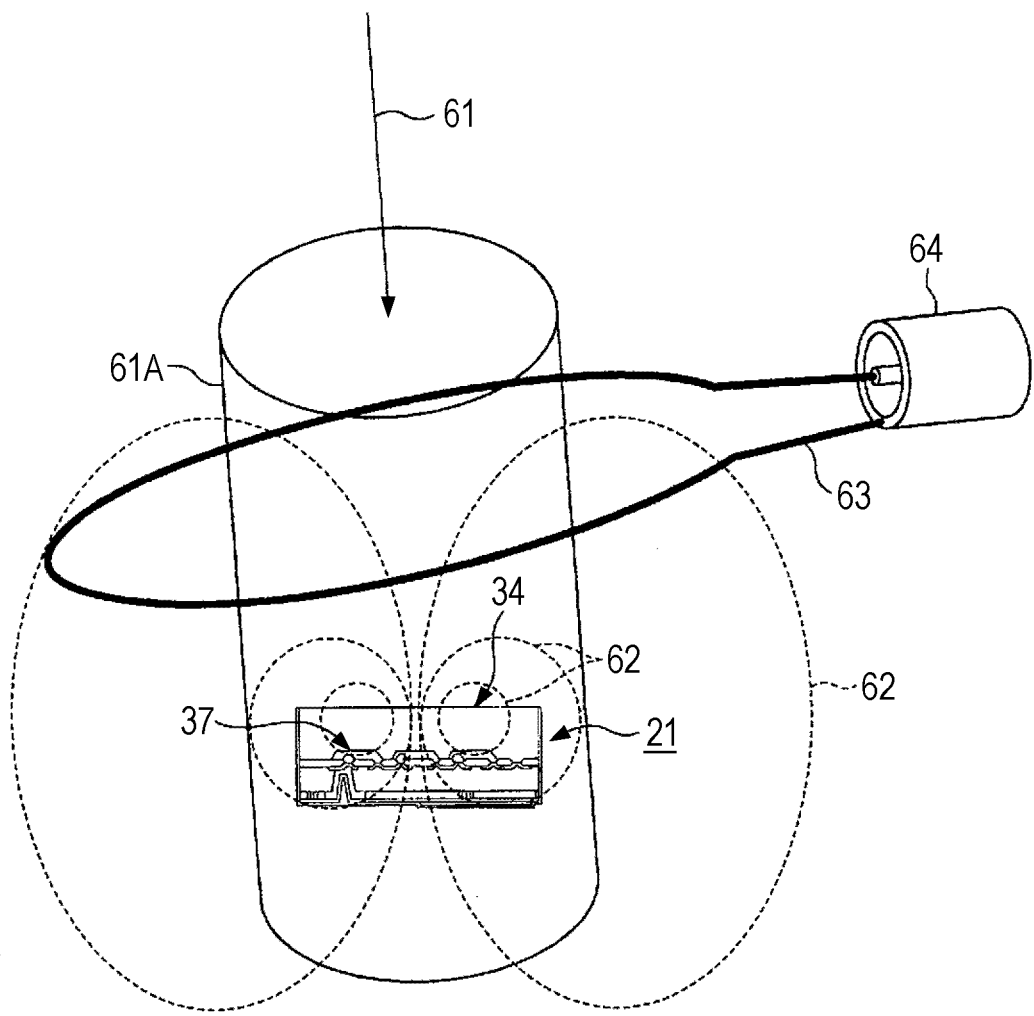

FIG. 12 depicts a diagram for explaining operation of an RF powder particle of the embodiment.

Figure 13:
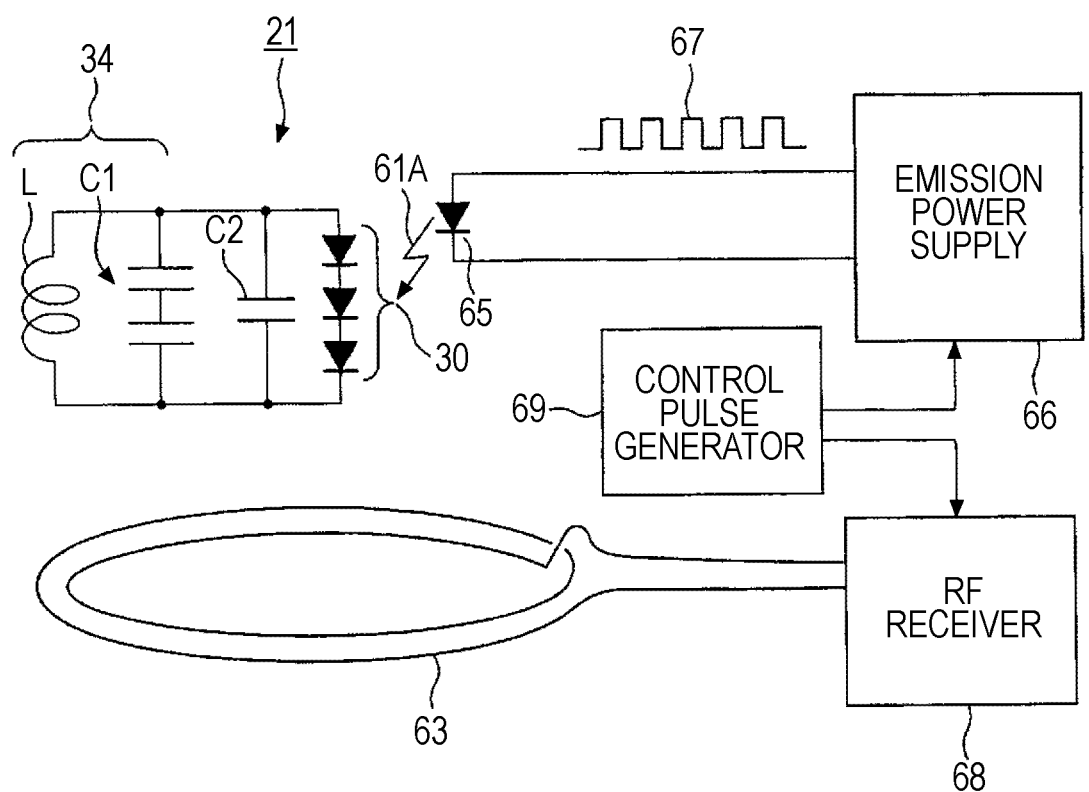

FIG. 13 depicts a structural diagram illustrating the detection operation using the RF powder particle of the embodiment and a detector.

Figure 14:
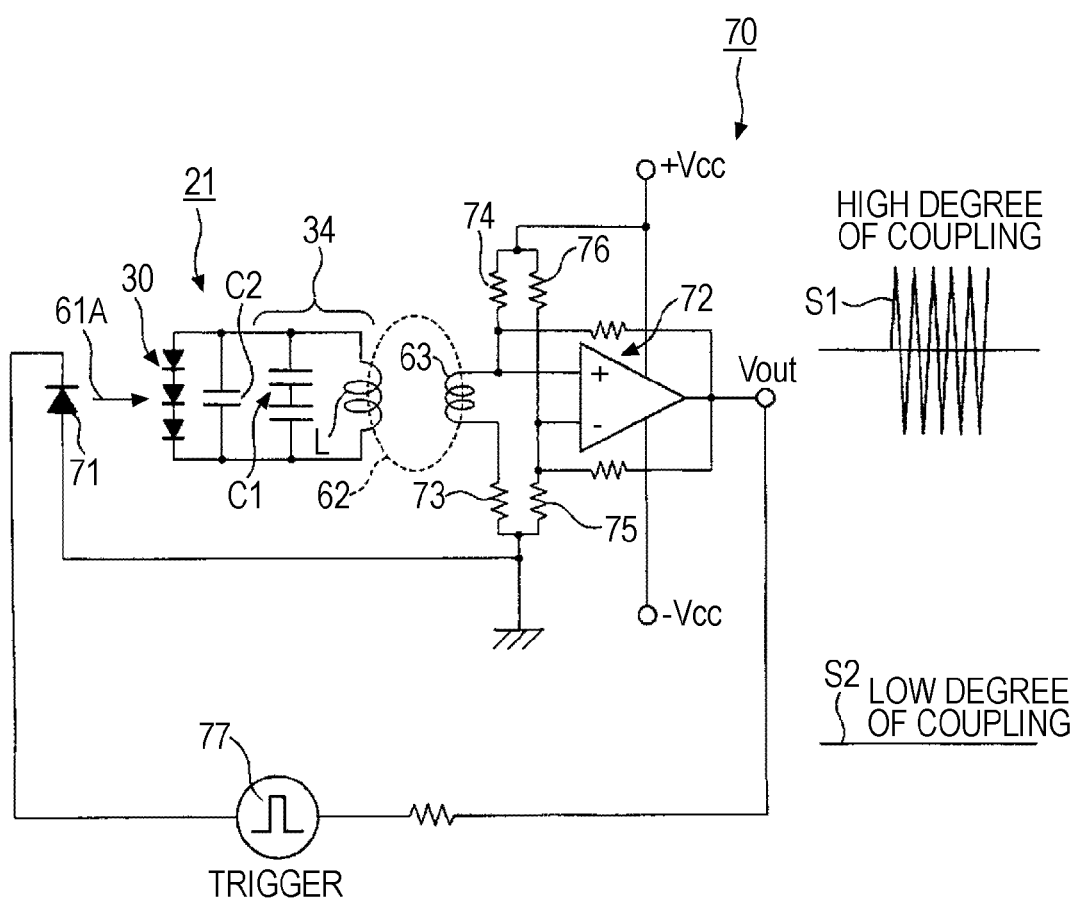

FIG. 14 depicts a structural diagram illustrating amplification of circulating current in the RF powder particle of the embodiment.

BEST MODES FOR CARRYING OUT THE INVENTION

The preferred embodiments (examples) of the invention will now be described with reference to the attached drawings.

Figure 1:
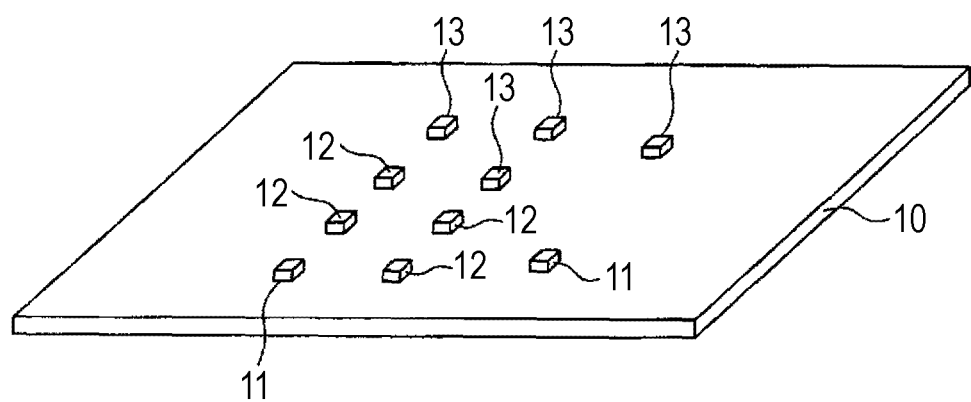
FIG. 1 depicts a cross-sectional perspective view of an RF powder-containing substrate to which the present invention is applied.

FIG. 1 is a sectional perspective view of an RF powder-containing substrate. The RF powder-containing substrate contains RF powder of the present invention.

FIG. 1 is an enlarged view. For example, the state in which three types of RF powder particles 11, 12, and 13 are attached on a surface of, for example, sheet-shaped or flexible plate-shaped substrate 10, such as a paper, is shown. Here, a bill is used as an example of the substrate 10. As described below, the RF powder particles 11, 12, and 13 respectively resonate at different radiofrequencies when irradiated with periodic pulsed light and generate radiofrequency electromagnetic fields (coupling element is the magnetic field). The RF powder particles 11, 12, and 13 have approximately the same size.

In practice, each of the RF powder particles 11, 12, and 13 is handled collectively in a powder form made up of many or a large amount of RF powder particles so as to constitute RF powder. In FIG. 1, a total of ten RF powder particles 11, 12, and 13 are shown, but the number of the RF powder particles is not limited to this. In view of how the powdery RF powder is used, in practice, the RF powder particles 11, 12, and 13 are dispersed over the entire surface of the sheet-shaped substrate 10. As described above, the substrate 10 containing many RF powder on the surface is referred to as "RF powder-containing substrate 10".

The term "RF powder" described above refers to powder made up of large quantities of particles usually used in a collective manner as powder (powdery or granular substance), each particle including an electrical circuit element (antenna circuit element) that generates radiofrequency electromagnetic field (RF) when energy (periodic pulsed light etc.) is supplied from outside, for transmitting and receiving information to and from an external reader.

A first embodiment of one RF powder particle constituting RF powder will now be described with reference to FIGS. 2 to 5.

Figure 2:
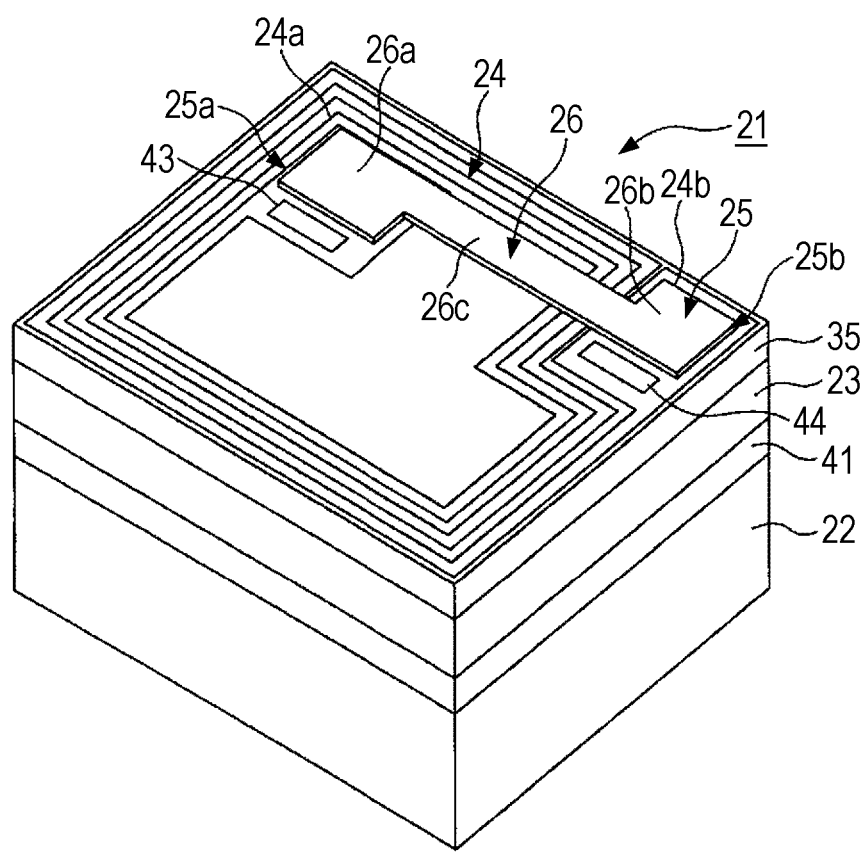
FIG. 2 depicts a perspective view of a first embodiment of one RF powder particle contained in the RF powder-containing substrate.
Figure 3:
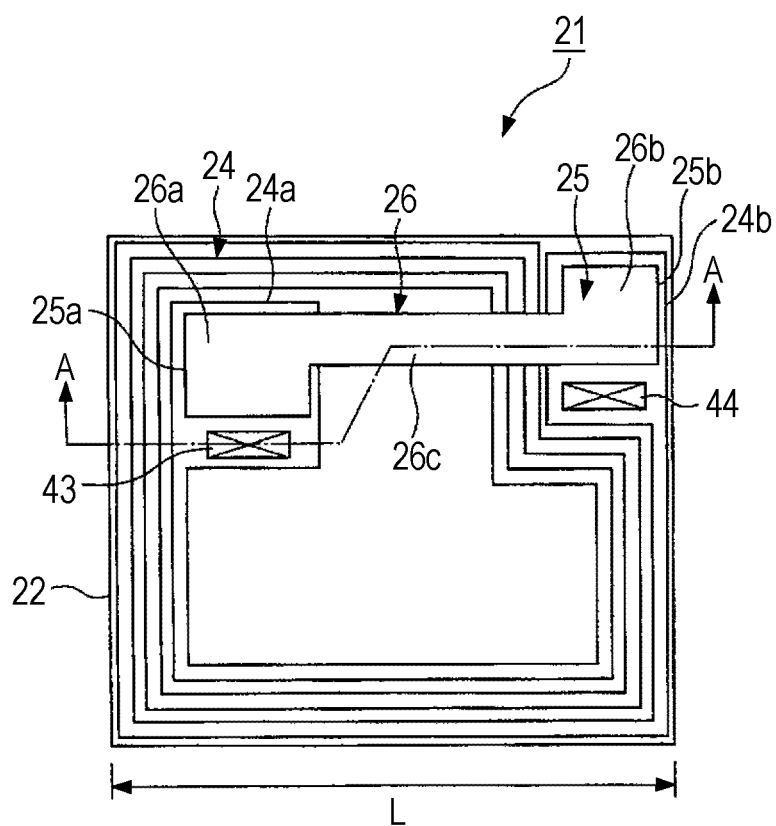
FIG. 3 depicts a plan view of the RF powder particle of the first embodiment.
Figure 4:
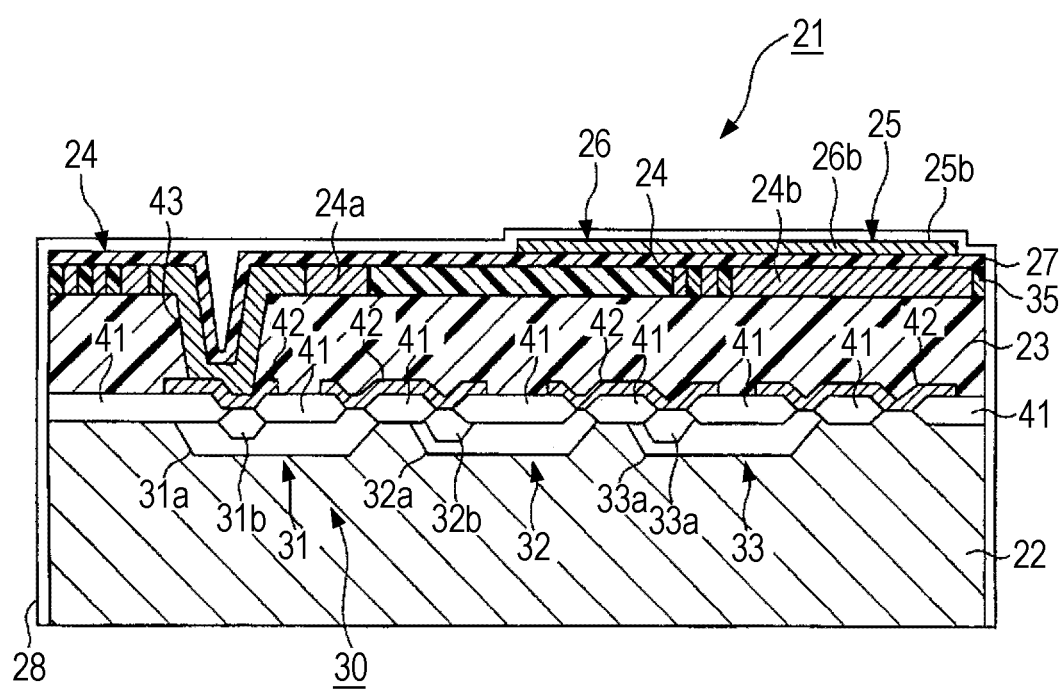
FIG. 4 depicts a cross-sectional view taken along line A-A in FIG. 3.
Figure 5:
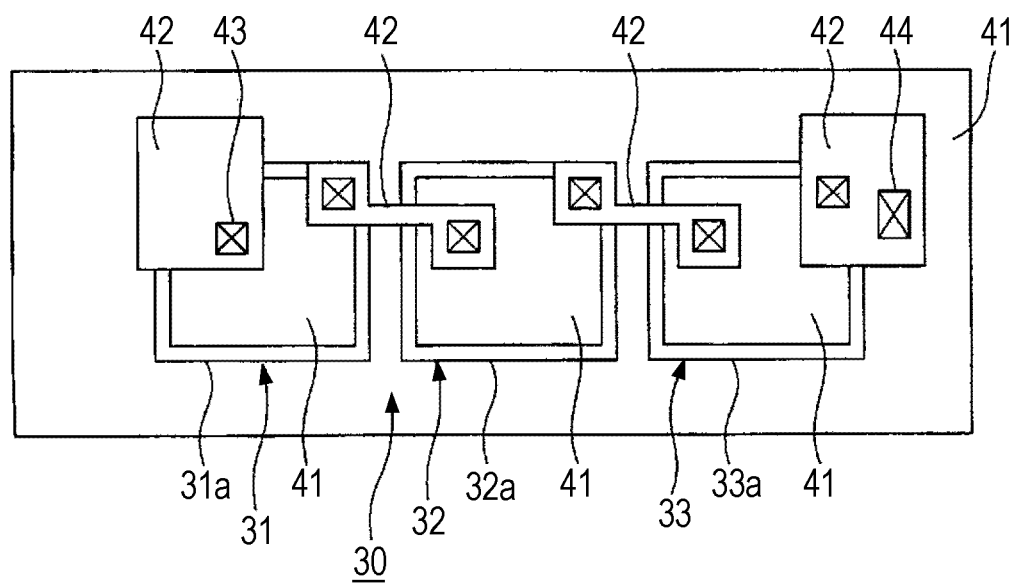
FIG. 5 depicts a plan view of a photodiode unit of a photovoltaic cell.

FIG. 2 is an external perspective view of an RF powder particle; FIG. 3 is a plan view of the RF powder particle; FIG. 4 is a vertical cross-sectional view taken along line A-A in FIG. 3; and FIG. 5 is a plan view of a photodiode unit formed below an insulating film. In vertical cross-sectional views of FIGS. 4 and 5, the thickness of the RF powder particle is exaggerated.

An RF powder particle 21 preferably has a cubic shape or a plate-like rectangular parallel-piped shape similar to a cube. With regard to the three-dimensional shape of the particle having a plurality of rectangular planes forming outside surfaces, those rectangular planes having the longest size are preferably equal to or larger than a 0.05 mm square but equal to or smaller than a 0.30 mm square in size, and are more preferably equal to or smaller than a 0.15 mm square. In this embodiment, the RF powder particle 21 is formed so that its plan shape is substantially square as shown in FIG. 3. Referring to FIG. 3, a side L of the substantially square plan shape of the RF powder particle 21 is 0.15 mm (150 µm) long, for example.

The RF powder particle 21 includes a substrate 22 composed of P-type silicon (Si) or the like and a photovoltaic cell 30 on the substrate 22, as shown in FIGS. 2 and 4. An insulating layer (oxide film such as $SiO_2$) 23 is formed on the photovoltaic cell 30, and a multiple winding coil 24 (inductance element) and a capacitor 25 (capacitance element) are formed on the insulating layer 23. The capacitor 25 is constituted by two portions 25a and 25b.

The coil 24 is disposed inside an insulating layer 35 ($SiO_2$, SiN, or the like) disposed on the insulating layer 23 at the upper surface of the RF powder particle 21. The coil 24 and the capacitor 25 resonate at a particular resonant frequency set to each RF powder particle 21 to generate a magnetic field around (this function is referred to as antenna function in this specification) and have an antenna function of generating radiofrequency electromagnetic fields. To be more exact, as described below, the coil 24 together with the capacitor 25 forms a tank circuit (34) and generates radiofrequency magnetic fields at a nearby region of the coil 24 by resonance effects in the tank circuit.

The coil 24, as shown in FIG. 2 or 3, is formed by winding one conductor wire three times, for example, along sides of the substantially square plan shape of the RF powder particle 21. The material of the conductor wire forming the coil 24 is, for example, copper (Cu).

Two ends of the coil 24 are formed as rectangular pads 24a and 24b having predetermined areas. Two pads 24a and 24b are respectively disposed at the inner peripheral side and the outer peripheral side of the loop-shaped coil 24. The pads 24a and 24b respectively function as lower electrodes of two capacitor elements 25a and 25b of the capacitor 25.

The pads 24a and 24b are, as described below, respectively electrically connected to an electrode 42 of a photodiode 31 and an electrode 42 of a photodiode 33 in the photovoltaic cell 30 via contact holes (through-wirings) 43 and 44.

In the above description, the number of turns, the length, and the shape of the coil 24 can be freely set according to the target resonant frequency design.

The capacitor 25 of this embodiment is constituted by two capacitor elements 25a and 25b. The capacitor element 25a includes the lower electrode 24a and an upper electrode 26a (aluminum (Al) or the like). The capacitor element 25b includes the lower electrode 24b and an upper electrode 26b. The upper electrodes 26a and 26b of the capacitor elements 25a and 25b are connected to each other through a conductor wire 26c. Actually, two upper electrodes 26a and 26b and the conductor wire 26c are formed as an integral conductor metal layer 26. An insulating film 27 ($SiO_2$) is provided between the lower electrode 24a and the upper electrode 26a and between the lower electrode 24b and the upper electrode 26b. The insulating film 27 electrically isolates the lower electrode 24a from the upper electrode 26a and the lower electrode 24b from the upper electrode 26b.

The insulating film 27 of the capacitor elements 25a and 25b is formed as one common layer of insulating film. The thickness of the insulating film 27 is, for example, 30 nm. The insulating film 27 electrically insulates the coil 24 from the conductor wire 26c connecting between the upper electrodes 26a and 26b in the region between two capacitor elements 25a and 25b.

According to the above-described structure, the capacitor 25 constituted by two capacitor elements 25a and 25b electrically connected to each other in series is connected between two ends of the coil 24. The coil 24 and the capacitor 25 connected to each other by forming a loop form a tank circuit (LC resonant circuit). The photovoltaic cell 37 generates power depending on light from a light source, and once the voltage output from the photovoltaic cell 30 rises faster than the resonant period, the tank circuit generates a radiofrequency magnetic field having a frequency coincident with the resonant frequency, followed by attenuation.

The resonant frequency of the tank circuit can be adequately designed by adjusting the size of the counter electrodes, i.e., the upper electrodes 26a and 26b and the lower electrode 24a and 24b of the capacitor 25. The frequency can also be designed by selection of the material and thickness of the dielectric material (insulator) 27.

The photovoltaic cell 30 is provided to supply radio frequency circulating current for causing resonant effects in the tank circuit constituted by the coil 24 and the capacitor 25, and is means for feeding initial energy to the tank circuit. Periodic pulsed light applied from outside is used as the energy source for power generation by the photovoltaic cell 30.

Figure 6:
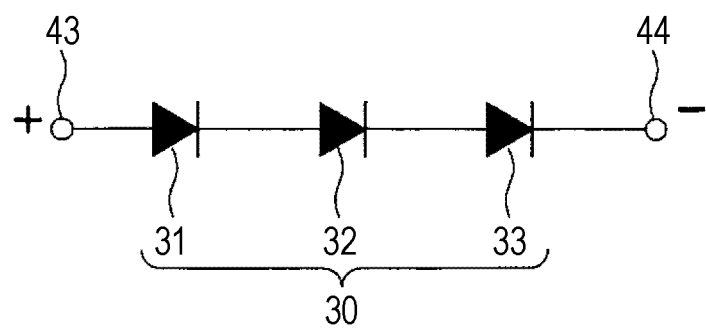
FIG. 6 depicts a schematic view showing an equivalent circuit of the photovoltaic cell.

Referring to FIGS. 4 and 5, the photovoltaic cell 30 is configured based on the series connection of the three photodiodes 31, 32, and 33, for example, disposed on the P-type silicon substrate 22. The photodiodes 31, 32, and 33 each convert the light applied from outside to electrical energy and output required power. The photodiodes 31, 32, and 33 are formed by utilizing PN junctions formed between N-type semiconductor regions 31a, 32a, and 33a and P-type semiconductor regions 31b, 32b, and 33b. The three PN junctions, i.e., the three photodiodes 31, 32, and 33, form three-stage series connection. The photovoltaic cell 30 achieves the required high voltage by the three-stage series connection. Each of the photodiodes 31, 32, and 33 forms a PNP junction with the P-type silicon substrate 22 to achieve insulation from the substrate 22. The P-type silicon substrate 22 and the N-type semiconductor regions (diffusion regions) 31a to 33a are in reverse bias, thereby forming an isolation structure. The photodiodes 31, 32, and 33 of the respective stages are separated from one another with a LOCOS (local oxidation of silicon) oxide film 41 and isolated. The photodiodes 31, 32, and 33 of the respective stages are connected in series with the aluminum wires 42. In FIG. 4, the electrode 42 of the photodiode 31 is connected to the contact hole 43 to thereby serve as a plus electrode, and the electrode 42 of the photodiode 33 is connected to the contact hole 44 to thereby serve as a minus electrode. To prevent the substrate 22 from electrical floating, the N-type semiconductor region 33a of the photodiode 33, which is the PN junction at the right end of FIG. 4, is connected to the P-type silicon substrate 22 via the Al wire 42. In this manner, the three photodiodes 31, 32, and 33 have the P-type silicon substrate 22 serving as the reference potential. Note that when an N-type silicon substrate is used as the substrate 22, the order of the PN junctions is reversed. When the photovoltaic cell 30 is expressed as an electrical circuit, the circuit structure includes the three photodiodes 31, 32, and 33 connected in series as shown in FIG. 6.

As obvious from FIG. 4, the entire surface of the RF powder particle 21 is coated with a P—SiN film 28. The P—SiN film 28 protects the entire surface at the side of the RF powder particle 21 where the tank circuit is formed.

In the description above, the capacitor 25 is constituted by the two capacitor elements 25a and 25b, but the configuration is not limited to this. The capacitor may be constituted by one of the capacitor elements. The capacitance of the capacitor 25 can be adequately changed by adjusting the areas of the electrodes. A plurality of capacitors may be arranged in parallel to achieve an appropriate design.

The RF powder particle 21 having the above-described structure includes on its upper surface the tank circuit constituted by the coil 24 and the capacitor 25 connected into a loop, and the photovoltaic cell 30 connected to the tank circuit. The photovoltaic cell 30 generated power based on the periodic pulsed light supplied from outside, and the circulating current is supplied to the tank circuit. Once the tank circuit receives the current from the photovoltaic cell 30, it generates radiofrequency magnetic fields determined by the resonant frequency. Thus, the RF powder particle 21 has capacity to resonate by the pulsed light at a designed frequency to generate magnetic fields outside.

Figure 7:
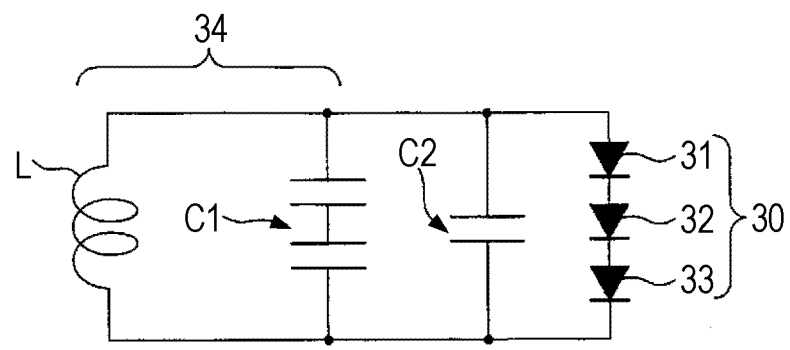
FIG. 7 depicts a circuit diagram showing an equivalent circuit of a tank circuit and a photovoltaic cell connected to the tank circuit according to this embodiment.

FIG. 7 shows an equivalent circuit of the tank circuit (LC resonant circuit) 34 formed on the RF powder particle 21, and the photovoltaic cell 30 connected to the tank circuit 34 in parallel. One tank circuit 34 is formed on the insulating layer 23 of one RF powder particle 21. The tank circuit 34 includes an inductance element (L) and a capacitance element (C1). The inductance element L is an element formed by the coil 24. The capacitance element C1 is an element formed by the capacitor 25. The capacitance element C1 is actually constituted by a series circuit of the two capacitor elements 25a and 25b. The photovoltaic cell 30, as described above, is constituted by a series circuit of the three photodiodes 31, 32, and 33. The photodiodes 31, 32, and 33 can be formed as a parallel circuit. A capacitance element C2 indicates the parasitic capacitance of the photodiodes 31, 32, and 33 and the capacitance is set to a value significantly smaller than the capacitance element C1.

Next, a method for making the RF powder particle 21 is described with reference to FIG. 4 etc. The photodiodes 31, 32, and 33 connected in series using the Al wires 42 on the P-type silicon substrate 22 are made by applying well known oxidation film insulation separation technique and impurity diffusion technique. The photovoltaic cell 30 is made as a result. The basic structure is, as shown in FIG. 4, that the photodiodes 31, 32, and 33 are connected in series in three stages. For practical purposes, in order to prevent interfacial leak with the oxide film 41, a guard-ring heavily doped diffusion layer is preferably formed between the diffusion layers or at the chip outermost periphery of the photovoltaic cell 30. The insulating layer (oxide film) 23 for antenna isolation is grown on the photovoltaic cell 30 thus formed, and the coil 24 and the capacitor 25 are formed thereon. In cases where many RF powder particles 21 are diced from one wafer to form powder, a pattern of incision lines is formed in the wafer by using a resist and the wafer is etched deeply (about 50 μm). After formation of a protective film, P—SiN film, the back surface of the wafer is grinded to separate the RF powder particles 21 in a powder form.

The basic manufacturing steps (1) to (41) of the RF powder particle 21 are briefly described below by a run of the item.

(1) Prepare a P-type silicon substrate. (2) Conduct pad oxidation 50 nm in thickness. (3) Make a plasma silicon nitride film (P—SiN film) 100 nm in thickness. (4) Form N-well windows by pattern exposure. (5) Implant phosphorus ions. (6) Strip resist. (7) Conduct isolation separation and window opening by pattern exposure. (8) Etch the P—SiN film. (9) Strip resist. (10) Conduct insulation oxidation at 1050° C. (11) Remove the P—SiN film. (12) Form P-well window by exposure. (13) Inject boron ions ($BF^{2+}$). (14) Anneal at 900° C. (15) Remove the pad oxide film. (16) Deposit Al/TiN to a thickness of 500 nm by sputtering. (17) Conduct exposure for Al wires. (18) Etch the Al wires. (19) Strip resist. (20) Form a TEOS oxide film 10 μm in thickness for antenna separation. (21) Conduct exposure for interconnection holes. (22) Conduct etching. (23) Strip resist. (24) Deposit a barrier metal TiN 100 nm in thickness by sputtering. (25) Conduct exposure of a coil pattern. (26) Deposit Cu to a thickness of 2 μm by plating. (27) Strip resist. (28) Remove TiN. (29) Grow a TEOS oxide film. (30) Conduct CMP on the oxide film. (31) Grow a dielectric film ($SiO_2$) for a capacitor to a thickness of 30 nm. (32) Deposit Al to a thickness of 500 nm by sputtering. (33) Conduct exposure of an Al pattern. (34) Etch Al. (35) Strip resist. (36) Conduct dicing pattern exposure. (37) Etch to a depth of 50 μm. (38) Strip resist. (39) Grow a P—SiN protective film to a thickness of 100 nm. (40) Grind the back surface. (41) Separate powder particles (powder chips).

The RF powder particles 21 are formed as a result.

Figure 8:
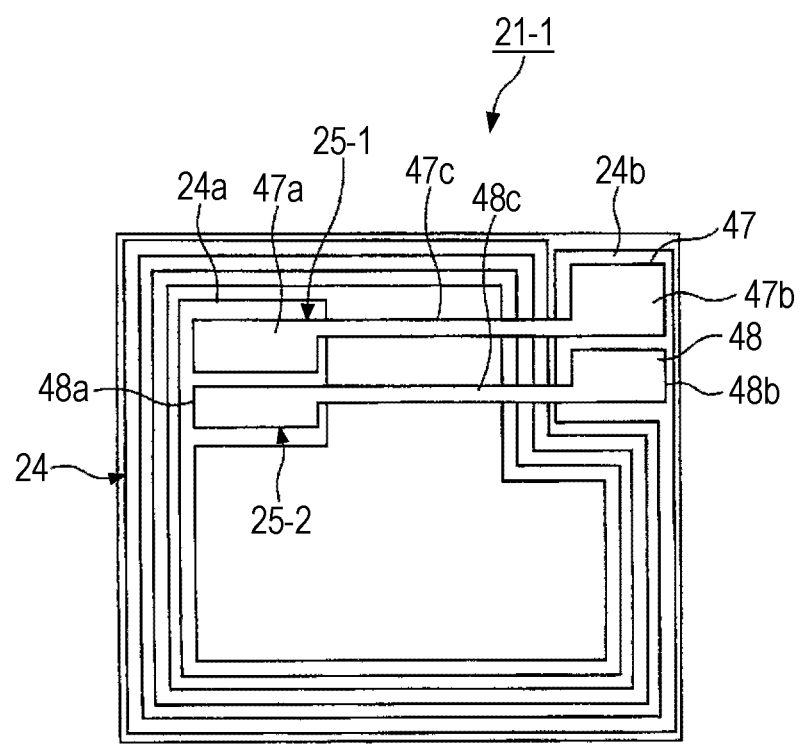
FIG. 8 depicts a plan view of an RF powder particle according to a second embodiment of the present invention.

Next, a second embodiment of an RF powder particle that makes RF powder is described with reference to FIG. 8. FIG. 8 is a plan view of an RF powder particle of the second embodiment, which corresponds to FIG. 3. In FIG. 8, the elements substantially the same as those elements described with reference to FIG. 3 are given the same reference numerals, and the detailed description therefor is omitted.

An RF powder particle 21-1 of the second embodiment is a modification of the RF powder particle 21 of the first embodiment. In the RF powder particle 21, the upper electrodes of the capacitor 25 were formed as one conductor metal layer 26 (26a and 26b). In contrast, in the RF powder particle 21-1 of this embodiment, two conductor metal layers 47 and 48 are provided to form the upper electrodes of the capacitor 25. In other words, this means the same as that the conductor metal layer 26 is divided into two parts to form two conductor metal layers (47 and 48). The conductor metal layer 47 is constituted by two upper electrodes 47a and 47b and a conductor wire 47c connecting between the upper electrodes 47a and 47b. The conductor metal layer 48 is constituted by two upper electrodes 48a and 48b and a conductor wire 48c connecting between the upper electrodes 48a and 48b. The upper electrode 47a and the upper electrode 48a are arranged to oppose the lower electrode 24a, and the upper electrode 47b and the upper electrode 48b are arranged to oppose the lower electrode 24b. Other structures are the same as those of the RF powder particle 21 of the first embodiment.

In the RF powder particle 21-1 of this embodiment having the above-described structure, a first capacitor 25-1 made of the conductor metal layer 47 and a second capacitor 25-2 made of the conductor metal layer 48 are provided as the capacitor 25.

According to the RF powder particle 21-1 of the second embodiment, since two capacitors 25-1 and 25-2 are disposed at the upper surface side, one value can be selected in a subsequent step from among three different capacitance values by cutting connection of one or none of the conductor wires 47c and the 48c of the two conductor metal layers 47 and 48, and thus, the resonant frequency of the tank circuit 34 can be changed. As a result, in the RF powder particle 21-1, one out of three different frequencies can be selected as the resonant frequency of the tank circuit 34. Thus, the production efficiency for achieving a variety of frequencies can be enhanced.

Figure 9:
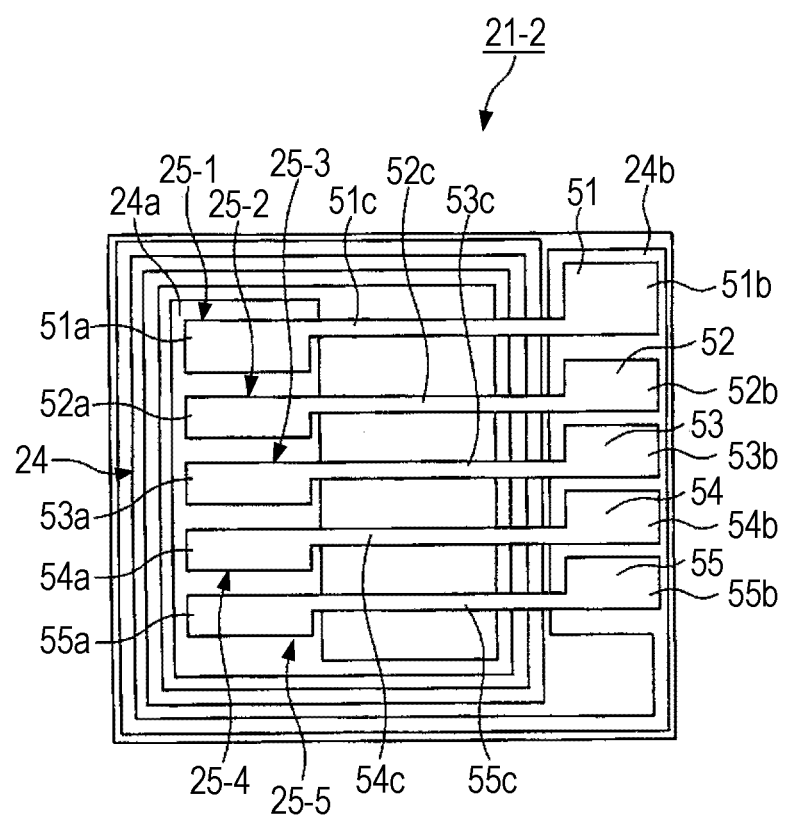
FIG. 9 depicts a plan view of an RF powder particle according to a third embodiment of the present invention.

Next, a third embodiment of an RF powder particle that makes RF powder is described with reference to FIG. 9. FIG. 9 is a plan view of an RF powder particle of the third embodiment. FIG. 9 corresponds to FIGS. 3 and 8. In FIG. 9, the elements substantially the same as those elements described with reference to FIG. 3 etc., are given the same reference numerals.

An RF powder particle 21-2 of the third embodiment is a modification of the RF powder particle 21-1 of the second embodiment. In the RF powder particle 21-2 of this embodiment, five conductor metal layers 51, 52, 53, 54, and 55 are formed to form upper electrodes of the capacitor 25. In other words, this means that the conductor metal layer formed at the upper side is divided into five parts to form five conductor metal layers 51, 52, 53, 54, and 55.

A pattern of the coil 24 is formed in the insulating layer 35 on the upper surface of the insulating layer 23 of the RF powder particle 21-2. The lower electrodes 24a and 24b are disposed at the inner peripheral side end and the outer peripheral side end of the coil 24, but have areas greater than the lower electrodes of the embodiments described above.

The conductor metal layer 51 includes two upper electrodes 51a and 51b and a conductor wire 51c connecting between the upper electrodes 51a and 51b. The conductor metal layer 52 includes two upper electrodes 52a and 52b and a conductor wire 52c connecting between the upper electrodes 52a and 52b. The conductor metal layer 53 includes two upper electrodes 53a and 53b and a conductor wire 53c connecting between the upper electrodes 53a and 53b. The conductor metal layer 54 includes two upper electrodes 54a and 54b and a conductor wire 54c connecting between the upper electrodes 54a and 54b. The conductor metal layer 55 includes two upper electrodes 55a and 55b and a conductor wire 55c connecting between the upper electrodes 55a and 55b.

The upper electrodes 51a, 52a, 53a, 54a, and 55a are arranged to oppose the lower electrode 24a and the upper electrodes 51a, 52a, 53a, 54a, and 55a are arranged to oppose the lower electrode 24b. Other structures are the same as those of the RF powder particle 21 of the first embodiment.

In the RF powder particle 21-2 of this embodiment having the above-described structure, first to fifth capacitors 25-1, 25-2, 25-3, 25-4, and 25-5 are respectively formed with the conductor metal layers 51, 52, 53, 54, and 55 as the capacitor 25.

In the RF powder particle 21-2 of the third embodiment, since there are five capacitors, disconnection of one or more of the wires of the five capacitors causes a change in capacitance from the value before disconnection, the resonant frequency of the tank circuit 34 can be changed, and the resonant frequency can be selected in the disconnection step. Although this embodiment provides five capacitors, the number of capacitors is not limited to five.

Figure 10:
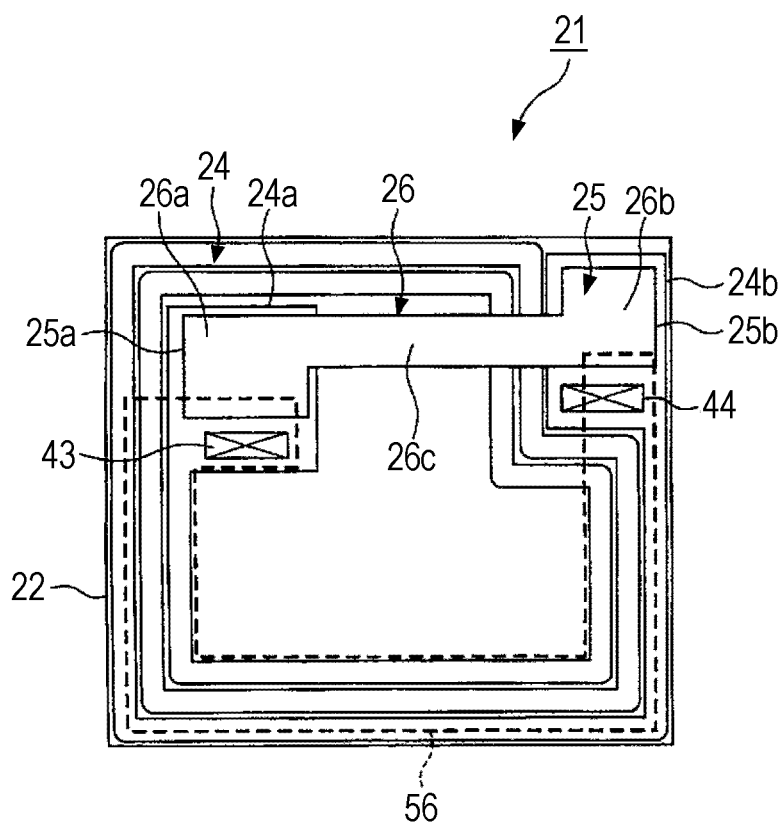

Next, a fourth embodiment of an RF powder particle that makes RF powder is described with reference to FIG. 10. FIG. 11 is a plan view of the RF powder particle of the fourth embodiment. FIG. 10 corresponds to FIG. 3. In FIG. 10, the elements substantially the same as those elements described with reference to FIG. 3 are given the same reference numerals.

In the RF powder particle 21 of the fourth embodiment, the region where the photodiodes 31 to 33 on the substrate 22 is placed is marked by dashed lines 56. The photodiode placement region indicated by the dashed lines 56 is under the region where the coil 24 is formed. According to this arrangement, the light irradiating the tank circuit 34-side surface is blocked. The light applied from the substrate 22-side irradiates the photodiodes, which thereby generate power. The RF powder particle 21 having one side shielded from light has the following advantages.

The substrate 22 of the RF powder particle 21 transmits incident light when the thickness is about 10 to 20 µm. Thus, it is possible to apply light from both the front and back surfaces of the RF powder particle 21. In such a case, light can be applied even when the front and back surfaces are flipped, and the tank circuit 34 can still be oscillated by exciting the photodiodes 31 to 33. In such a case, no problem occurs if the plurality of RF powder particles are dispersed and a light spot irradiates only one RF powder particle. However, special problems arise when a plurality of RF powder particles are arranged in a light spot.

That is, if the back and front surfaces are inverted between the RF powder particles, magnetic fields generated from the two RF powder particles simultaneously irradiated with light will have inverted phases and diminish each other. Under a condition where there are the same number of RF powder particles with front surfaces up as RF powder particles with back surfaces up, the magnetic fields generated therefrom will completely cancel out one another.

In order to resolve such a problem, one side of the RF powder particle 21 is preferably shielded from light. In the RF powder particles (21, 21-1, and 21-2), the coil 24, the capacitor 25, and the like are formed to shield part of the surface of the RF powder particle 21. However, as in this embodiment, the photodiodes 31, 32, and 33 are preferably designed to lie under the coil 24, which is a metal film formed intentionally. Alternatively, a different material may be used for shielding.

As described above, if one side of the RF powder particle 21 is shielded from light and a plurality of RF powder particles are contained in one light spot, only those which are unshielded will operate. Thus, selecting which RF powder particles to irradiate with light based on which of the front and back surfaces is facing up is no longer necessary, which is an advantage. When a large number of RF powder particles having one side shielded are incorporated in a sheet-like member, the ratio of those with front surfaces facing up to those with back surfaces facing up is about 50:50. In such a case, applying transmitting light from both sides of the sheet and shifting the timing of the pulses by half the period of the resonant oscillation will allow oscillation that intensifies the generated magnetic fields.

Next, referring to FIG. 11, another example structure of the photovoltaic cell 30 formed in the RF powder particle 21 is described. FIG. 11 is a plan view of a part of the photovoltaic cell 30. FIG. 11 corresponds to FIG. 5. In FIG. 11, the elements substantially the same as those elements described with reference to FIG. 5 are given the same reference numerals.

In the photovoltaic cell 30, the Al wires 42 for connecting the photodiodes 31, 32, and 33 have large areas as shown in FIG. 11 so that one sides (front surfaces) of the photodiodes 31, 32, and 33 are shielded with the Al wires 42 from light. As a result, light applied to the tank circuit-side surfaces are shielded by the Al wires 42, and the photodiodes 31, 32, and 33 generate power by light incident from the substrate side.

As in the fourth embodiment, of the RF powder particles 21 having the photovoltaic cells 30 structured as above and having one side shielded from light, only those not shielded operate when a plurality of RF powder particles are contained in a light spot. Thus, selecting the front or back surfaces of the RF powder particles is not needed. When a large number of RF powder particles 21 having the photovoltaic cells 30 having one side shielded by the Al wires 42 are incorporated in a sheet, a half faces front surfaces up and a half faces back surfaces up. In such a case, oscillation intensifying the generated magnetic fields can be achieved by irradiating both sides of the sheet with the transmitting light and shifting the timing of the pulses by a half period of the resonant oscillation.

The operation of the RF powder particle 21 having the above-described structure and detection and measurement of radiofrequency magnetic fields will now be described with reference to FIGS. 12 and 13. In the description below, the RF powder particle 21 of the first embodiment described with reference to FIGS. 2 to 7 is described as an example.

Operation of the RF powder particle 21 will now be described with reference to FIG. 12. As mentioned earlier, the RF powder particle 21 includes the photovoltaic cell 30 including the photodiodes 31, 32, and 33 and the tank circuit 34 including the coil 24 and the capacitor 25. The photovoltaic cell 30 is connected to the tank circuit 34 via through wires formed by the contact holes 43 and 44.

FIG. 12 shows a state in which light 61A is applied from outside toward one RF powder particle 21 as indicated by arrow 61 and a detection coil 63 for detecting and measuring radiofrequency magnetic fields 62 generated from the RF powder particle 21 is disposed near the RF powder particle 21. The detection coil 63 is a single-wound or multiple-wound Helmholtz coil. One end of the detection coil 63 is connected to a center conductor of a coaxial line 64 and the other end is connected to an external conductor of the coaxial line 64. The detection coil 63 is part of a receiver for receiving the generated magnetic fields 62 from the tank circuit 34 in the RF powder particle 21.

The light 61A is light emitted from a light source such as a LED or laser. When the RF powder particle 21 is irradiated with the light 61A, the photovoltaic cell 30 generates photoelectromotive force. The light energy applied to the RF powder particle 21 should be light with 1.14 eV photon energy, which is the bandgap of silicon. However, since the fundamental absorption end of silicon is of an indirect transition type and thus has low efficiency, light having higher energy and shorter wavelength than blue light larger than the energy gap of the fundamental absorption end is preferred. When the PN junctions constituting the photovoltaic cell 30 are irradiated with light, a difference in Fermi energy is generated and photovoltaic generation occurs. A voltage corresponding to the difference in Fermi energy is generated at the two ends of the photodiodes 31, 32, and 33.

Referring to FIG. 13, detection and measurement of radio frequency magnetic waves generated from the RF powder particle 21 are described. FIG. 13 shows the RF powder particle 21 expressed as an equivalent circuit and a detector for detecting the magnetic fields 62.

The RF powder particle 21 includes the tank circuit 34 and the photovoltaic cell 30 (photodiodes 31, 32, and 33) connected to the tank circuit 34 in parallel. A light source 65 such as a LED, semiconductor laser, or the like is arranged relative to the RF powder particle 21. A periodic pulse signal 67 is supplied to the light source 65 from an emission power supply 66. The light source 65 emits the light 61A as a result. The light 61A is periodic pulsed light. The periodic pulsed light 61A is applied to the photovoltaic cell 30 of the RF powder particle 21.

The positional relationship is that the detection coil 63 is arranged near the RF powder particle 21. The detection coil 63 is double wound, for example. The detection coil 63 is connected to an RF receiver 68. The RF receiver 68 receives radiofrequency magnetic fields based on the resonance effect from the tank circuit 34 of the RF powder particle 21.

A control pulse generator 69 is connected to the emission power supply 66 and the RF receiver 68. The emission power supply 66 causes the light source 65 to periodically emit light on the basis of the frequency of the pulse signal supplied from the control pulse generator 69. The RF receiver 68 receives the detection signal from the detection coil 63 at the same frequency as the frequency of the periodic pulsed light from the light source 65 on the basis of the pulse signal from the control pulse generator 69. As a result, one can receive the magnetic fields 62 from the tank circuit 34 very high sensitively by frequency keying detection.

In the case where the light 61A is applied as a single pulse from the light source 65, ringing occurs due to the resonant operation of the tank circuit 34, and the circulating current caused by the resonance effect disappears. Since the ringing caused by single pulsed light is small, its detection is not easy. However, energy can be supplied to the tank circuit 34 through power generation of the photovoltaic cell 30 by generating, as the light 61A, periodic pulsed light at a period coinciding with the period of the resonant frequency of the tank circuit 34 or an integral multiple thereof. Not only the energy consumed can be covered but also energy can be accumulated by application of light at a period corresponding to the period of charging the capacitance element (C1). By repeating this operation, the energy accumulated in the tank circuit 34 can be increased. As a result, the circulating current in the tank circuit 34 can be amplified with the number of pulses of the periodic pulsed light. The intensity of the magnetic field 62 emitted outside from the tank circuit 34 increases with the number of pulses of the pulsed light; however, once the frequency of the light pulse deviates from the resonant frequency of the tank circuit 34, timing for power supply also deviates, and power is no longer supplied. In view of this, the resonant frequency of the tank circuit 34 irradiated with the light 61A can be identified by measuring the intensity of the radiofrequency magnetic field by varying the pulse frequency of the periodic pulsed light 61A.

As described above, a simple method for detecting the radiofrequency magnetic fields 62 generated around the tank circuit 34 of the RF powder particle 21 is to use the detection coil 63. Alternatively, the radiofrequency magnetic fields 62 can be detected with a Hall device. Since the radiofrequency magnetic fields 62 generated outside intensifies with an increase in the number of pulsed light, the detection sensitivity is set by setting the number of sequential pulsed light. Since the frequency of the pulsed light is coincident with the frequency of the circulating current (frequency of external magnetic fields) of the tank circuit 34, a positive feedback circuit loop is formed by generating the pulsed light by the detection signal. In this manner, the frequency coincident with the resonant frequency of the tank circuit 34 of the RF powder particle 21 is automatically selected, and the ringing oscillation is continued.

Next, referring to FIG. 14, the measurement system in the case where the ringing oscillation continues in the tank circuit 34 of the RF powder particle 21 is described.

In FIG. 14, reference numeral 21 denotes the above-described RF powder particle, 70 denotes a measurement device, and 71 denotes a light source corresponding to the light source 65 described above. The RF powder particle 21 includes the photovoltaic cell 30 and the tank circuit 34. The light source 71 emits periodic pulsed light 61A by a trigger pulse 77. The detector 70 includes an operational amplifier 72, and the detection coil 63 is connected to the input side of the operational amplifier 72. The operational amplifier 72 includes resistors 73, 74, 75, and 76 that determine the operating point. The light source 71 illustrated is a light-emitting diode.

According to the measurement system having the above-described configuration, periodic trigger voltage is applied to irradiate the photovoltaic cell 30 with the periodic pulsed light 61A from the light source 71. As a result, the radiofrequency magnetic fields 62 that attenuate by the resonance effect in the tank circuit 34 are generated. The radiofrequency magnetic fields 62 are amplified and oscillated, and the oscillation voltage signal is fed back to the light source 71 side through the detector 70 so as to apply voltage having the same frequency as the resonant frequency specific to the tank circuit 34. As a result, pulsed light having the same frequency is emitted and this allows the oscillation of the tank circuit 34 to continue.

Referring to FIG. 14, the signal output from an output terminal 72a of the detector 70 forms an oscillation signal S1 with a high amplitude level by formation of a positive feedback loop when the degree of resonance magnetic field coupling between the inductance element L of the tank circuit 34 and the detection coil 63 is high, and forms a signal S2 with substantially zero amplitude level when the degree of electromagnetic coupling is small or when the trigger frequency deviates from the resonant frequency.

In the case where the resonant frequency of the powder is known in advance and only the positions of the particles are to be identified with the pulsed light, a trigger having the same frequency can be applied from the beginning to locate particles.

In applying the periodic pulsed light according to the method of exciting the photovoltaic cell 30 of the RF powder particle 21 or the like, periodic pulsed light irradiating the back surface side of the substrate and periodic pulsed light irradiating the front surface side of the substrate can be used. In such a case, the oscillation phases of the powder with opposite sides up are inverted, and this weakens the external magnetic fields. To avoid this, it is effective to shift the irradiation timings of the two periodic pulsed light from each other by a half period.

The structure, shape, size, and positional relationships described in the embodiments above are roughly described to allow understanding and implementation of the present invention. Thus the present invention is not limited to the embodiments described above and various modifications and alterations are possible without departing from the technical scope set forth in Claims.

INDUSTRIAL APPLICABILITY

The RF powder particles and the like of the present invention can be used in bills, credit cards, documents, etc., to securely prevent counterfeit or the like.

10: RF powder-containing substrate
11, 12, 13: RF powder particle
21: RF powder particle
21-1: RF powder particle
21-2: RF powder particle
22: substrate
23: insulating layer
24: coil
25: capacitor
27: insulating film
30: photovoltaic cell
31, 32, 33: photodiode
34: tank circuit
61A: periodic pulsed light
62: magnetic field
63: detection coil
65: light source
70: detector

The invention claimed is:

1. An RF powder made up of RF powder particles characterized in that an inductance element as an electromagnetic coupling element for generating a magnetic field and a capacitance element connected to both ends of the inductance element are formed on a substrate, the inductance element and the capacitance element thereby forming a tank circuit, and that a photovoltaic cell for supplying electric power to the tank circuit is formed on the substrate, wherein the tank circuit contained in the RF powder particles generates a radiofrequency magnetic field on the basis of periodic pulsed light applied to the photovoltaic cell from outside, and a frequency of the periodic pulsed light is equal to a resonant frequency of the tank circuit or an integer multiple of the resonant frequency of the tank circuit.

2. The RF powder according to claim 1, wherein the inductance element is formed by a coil formed on the insulating film surface, and the photovoltaic cell is connected between both ends of the coil.

3. The RF powder according to claim 2, wherein the coil is separated from the photovoltaic cell by a distance of 10 μm or more.

4. The RI powder according to claim 3, wherein the coil and the photovoltaic cell are separated from each other with an oxide film therebetween.

5. The RF powder according to claim 1, wherein the substrate is a semiconductor substrate and the photovoltaic cell is a photodiode including a PN junction formed on the semiconductor substrate.

6. The RF powder according to claim 5, wherein the photovoltaic cell is a cell including a plurality of the photodiodes connected in series or parallel.

7. The RF powder according to claim 1, wherein the photovoltaic cell has two light-receiving surfaces and a light-shielding unit for preventing light irradiation to one of the light-receiving surfaces is provided.

8. The RF powder according to claim 7, wherein the inductance element or the capacitance element serves as the light-shielding unit.

9. The RF powder according to claim 8, wherein a position of the photovoltaic cell is below a position of the inductance element of the substrate.

10. The RF powder according to claim 1, wherein the capacitance element is positioned above the inductance element of the substrate.

11. A method for exciting the RF powder according to claim 1, wherein
the RF powder particles are irradiated with light from a light source; electric power is generated in a photovoltaic cell contained in the RF powder particles by using the light; and a radiofrequency magnetic field is generated from a tank circuit contained in the RF powder particles by using the electric power, and
the light is a periodic pulsed light and a pulse frequency of the periodic pulsed light is made to coincide with a resonant frequency of the tank circuit.

12. The method for exciting the RF powder according to claim 11, wherein the light is laser light emitted from a semiconductor laser.

13. The method for exciting the RF powder according to claim 11, wherein the light is light emitted from a LED.

14. The method for exciting the RE powder according to claim 11, wherein irradiation with the periodic pulsed light is carried out by first periodic, pulsed light that irradiates a back surface side of a substrate of the inductance element and second periodic, pulsed light that irradiates a front surface side of the substrate.

15. The method for exciting the RE powder according to claim 12, wherein irradiation with the periodic pulsed light is carried out by first periodic pulsed light that irradiates a back surface side of a substrate of the inductance element and second periodic pulsed light that irradiates a front surface side of the substrate.

16. The method for exciting the RF powder according to claim 13, wherein irradiation with the periodic, pulsed light is carried out by first periodic, pulsed light that irradiates a back surface side of a substrate of the inductance element and second periodic pulsed light that irradiates a front surface side of the substrate.

17. The method for exciting the RF powder according to claim 14, wherein irradiation timing of the first periodic pulsed light is different from irradiation timing of the second periodic pulsed light.

18. The method for exciting the RF powder according to claim 15, wherein irradiation timing of the first periodic pulsed light is different from irradiation timing of the second periodic pulsed light.

19. The method for exciting the RF powder according to claim 16, wherein irradiation timing of the first periodic pulsed light is different from irradiation timing of the second periodic pulsed light.

20. A method for exciting the RF powder according to claim 1, comprising:
irradiating the RF powder particles with light from a light source, generating electric power in a photovoltaic cell contained in the RF powder particles by using the light, and generating a radiofrequency magnetic field in a tank circuit contained in the RF powder particles by using the electric power;
wherein the light is periodic pulsed light and a pulse frequency of the periodic pulsed light is made to coincide with a resonant frequency of the tank circuit over an integer.

21. The method for exciting the RF powder according to claim 20, wherein the light is laser light emitted from a semiconductor laser.

22. The method for exciting the RF powder according to claim 20, wherein the light is light emitted from a LED.

23. The method for exciting the RF powder according to claim 20, wherein irradiation with the periodic pulsed light is carried out by first periodic pulsed light that irradiates a back surface side of a substrate of the inductance element and second periodic pulsed light that irradiates a front surface side of the substrate.

24. The method for exciting the RF powder according to claim 21, wherein irradiation with the periodic pulsed light is carried out by first periodic pulsed light that irradiates a back surface side of a substrate of the inductance element and second periodic pulsed light that irradiates a front surface side of the substrate.

25. The method for exciting the RF powder according to claim 22, wherein irradiation with the periodic pulsed light is carried out by first periodic pulsed light that irradiates a back surface side of a substrate of the inductance element and second periodic pulsed light that irradiates a front surface side of the substrate.

26. The method for exciting the RF powder according to claim 23, wherein irradiation timing of the first periodic pulsed light is different from irradiation timing of the second periodic pulsed light.

27. The method for exciting the RF powder according to claim 24, wherein irradiation timing of the first periodic pulsed light is different from irradiation timing of the second periodic pulsed light.

28. The method for exciting the RF powder according to claim 25, wherein irradiation timing of the first periodic pulsed light is different from irradiation timing of the second periodic pulsed light.

* * * * *

UNITED STATES PATENT AND TRADEMARK OFFICE
CERTIFICATE OF CORRECTION

PATENT NO.         : 8,704,202 B2
APPLICATION NO.    : 12/516715
DATED              : April 22, 2014
INVENTOR(S)        : Furumura et al.

It is certified that error appears in the above-identified patent and that said Letters Patent is hereby corrected as shown below:

On the Title Page, Item (75), under "Inventors", in Column 1, Line 2, delete "Tokyo (JP);" and insert -- Chiyoda, Tokyo (JP); --, therefor.

In the Claims

In Column 14, Line 61, in Claim 4, delete "RI powder" and insert -- RF powder --, therefor.

In Column 15, Line 34, in Claim 14, delete "RE powder" and insert -- RF powder --, therefor.

In Column 15, Line 36, in Claim 14, delete "periodic," and insert -- periodic --, therefor.

In Column 15, Line 38, in Claim 14, delete "periodic," and insert -- periodic --, therefor.

In Column 15, Line 40, in Claim 15, delete "RE powder" and insert -- RF powder --, therefor.

In Column 15, Line 47, in Claim 16, delete "the periodic," and insert -- the periodic --, therefor.

In Column 15, Line 48, in Claim 16, delete "first periodic," and insert -- first periodic --, therefor.

Signed and Sealed this
Twenty-sixth Day of August, 2014

Michelle K. Lee
*Deputy Director of the United States Patent and Trademark Office*